United States Patent
Smith et al.

(10) Patent No.: US 11,654,747 B2
(45) Date of Patent: May 23, 2023

(54) SYSTEM AND METHOD FOR CONTROLLING FLUID TEMPERATURE IN A THERMAL SYSTEM

(71) Applicant: GM GLOBAL TECHNOLOGY OPERATIONS LLC, Detroit, MI (US)

(72) Inventors: Michael A. Smith, Clarkston, MI (US); Eugene V. Gonze, Pinckney, MI (US); Richard J. Lopez, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 16/784,799

(22) Filed: Feb. 7, 2020

(65) Prior Publication Data

US 2021/0245576 A1    Aug. 12, 2021

(51) Int. Cl.
*B60H 1/00* (2006.01)
*F01P 3/20* (2006.01)
*B60H 1/14* (2006.01)
*B60H 1/03* (2006.01)
(Continued)

(52) U.S. Cl.
CPC ........... *B60H 1/00885* (2013.01); *B60H 1/03* (2013.01); *B60H 1/14* (2013.01); *F01P 3/20* (2013.01); *F01P 7/165* (2013.01); *B60H 2001/3267* (2013.01); *F01P 2060/04* (2013.01);
(Continued)

(58) Field of Classification Search
CPC ........ B60H 1/00885; B60H 1/03; B60H 1/14; B60H 2001/3267; F01M 5/005; F01P 3/20; F01P 7/165; F01P 2001/3267; F01P 2060/04; F01P 2060/045; F01P 2060/08; F01P 2060/12; F16H 57/0413
See application file for complete search history.

(56) References Cited

U.S. PATENT DOCUMENTS 4,380,909 A * 4/1983 Sung ................. F25B 30/04
                                                    62/476
7,275,382 B2 * 10/2007 Cho ................. F25B 27/02
                                                    62/238.7
(Continued)

FOREIGN PATENT DOCUMENTS

CN    107304706 A    10/2017
CN    108973585 A    12/2018
(Continued)

*Primary Examiner* — Ljiljana V. Cinc
(74) *Attorney, Agent, or Firm* — Quinn IP Law (57) ABSTRACT

A system for controlling fluid temperature in a thermal system includes a heat source, a heat sink coupled to the heat source, a first heat exchanger and a second heat exchanger, a first expansion valve configured to regulate the flow of coolant between the heat source and the first heat exchanger, a second expansion valve configured to regulate the flow of coolant between the heat source and the second heat exchanger, and a controller. The controller is configured to determine an operating condition of the thermal system and generate a first control signal to control the first and second expansion valves to direct the flow of coolant to the first and second heat exchangers. The first and second expansion valves are arranged in parallel to recover heat rejected from the coolant and distribute the recovered heat to the first and second heat exchangers.

9 Claims, 3 Drawing Sheets

(51) Int. Cl.
*F01P 7/16* (2006.01)
*B60H 1/32* (2006.01)

(52) U.S. Cl.
CPC ..... *F01P 2060/045* (2013.01); *F01P 2060/08* (2013.01); *F01P 2060/12* (2013.01)

(56) References Cited

U.S. PATENT DOCUMENTS

| | | | |
|---|---|---|---|
| 7,789,176 B2* | 9/2010 | Zhou | B60L 58/26 |
| | | | 180/65.1 |
| 9,517,680 B2* | 12/2016 | Suzuki | B60H 1/00064 |
| 9,643,470 B2* | 5/2017 | Suzuki | B60H 1/00485 |
| 9,731,577 B2* | 8/2017 | Johnston | B60H 1/00921 |
| 9,784,486 B2* | 10/2017 | Miyakoshi | F25B 6/02 |
| 10,369,866 B2* | 8/2019 | Yamanaka | B60H 1/00278 |
| 11,117,444 B2* | 9/2021 | Kim | B60H 1/004 |
| 11,458,798 B2* | 10/2022 | Lee | B60L 58/26 |
| 11,604,011 B2* | 3/2023 | Lee | F25B 1/00 |
| 2008/0295785 A1 | 12/2008 | Harris et al. | |
| 2011/0120396 A1 | 5/2011 | Myers et al. | |
| 2019/0210430 A1* | 7/2019 | Choi | B60H 1/00921 |
| 2021/0016625 A1* | 1/2021 | Lee | B60K 11/02 |
| 2021/0245576 A1* | 8/2021 | Smith | B60H 1/14 |

FOREIGN PATENT DOCUMENTS

| | | |
|---|---|---|
| CN | 110094253 A | 8/2019 |
| DE | 112009004747 B4 | 7/2014 |
| DE | 102017108149 A1 | 10/2017 |
| DE | 102017207159 A1 | 11/2017 |
| DE | 102017108832 A1 | 10/2018 |

* cited by examiner

SYSTEM AND METHOD FOR CONTROLLING FLUID TEMPERATURE IN A THERMAL SYSTEM

INTRODUCTION

The present disclosure relates generally to a system and method for controlling fluid temperature in a thermal system, specifically using two-phase heat transfer for engine heat rejection.

Efficient operation of a powertrain system depends on various factors, including operating conditions and load demands. Heating and/or cooling engine oil and/or transmission oil via heat exchangers and heat sinks provides some measure of temperature control. However, many systems include multiple pathways and components that increase system complexity and introduce packaging constraints.

SUMMARY

Embodiments according to the present disclosure provide a number of advantages. For example, embodiments according to the present disclosure use a two-phase heat transfer compatible coolant, such as a refrigerant, to enable increased operating temperature of the engine and energy distribution to other components of the vehicle system to increase overall energy optimization and fuel economy.

In one aspect of the present disclosure, a system for controlling fluid temperature in a thermal system includes a heat source, a heat sink coupled to the heat source such that a flow of coolant passes between the heat source and the heat sink, a first heat exchanger coupled to the heat source, a second heat exchanger coupled to the heat source, a first expansion valve coupled to the heat source and the first heat exchanger, the first expansion valve configured to regulate the flow of coolant between the heat source and the first heat exchanger, a second expansion valve coupled to the heat source and the second heat exchanger, the second expansion valve configured to regulate the flow of coolant between the heat source and the second heat exchanger, and a controller in electronic communication with the heat source, the first expansion valve, and the second expansion valve. The controller is configured to determine an operating condition of the thermal system and generate a first control signal to control the first expansion valve to direct the flow of coolant to the first heat exchanger and a second control signal to control the second expansion valve to direct the flow of coolant to the second heat exchanger. The first and second expansion valves are arranged in parallel to recover heat rejected from the coolant and distribute the recovered heat to the first and second heat exchangers.

In some aspects, the heat source is an engine.

In some aspects, the heat sink is a radiator.

In some aspects, the first heat exchanger is an engine oil heat exchanger.

In some aspects, the second heat exchanger is a transmission oil heat exchanger.

In some aspects, the operating condition includes a first operating condition and a second operating condition, the first operating condition including operation of the heat source in a first environment and the second operating condition including operation of the heat source in a second environment and the second environment is cooler than the first environment.

In some aspects, the coolant is a two-phase heat transfer compatible fluid.

In some aspects, the coolant is a refrigerant.

In some aspects, the system further includes a heater core and the controller is configured to direct the flow of coolant to the heater core such that the heater core rejects heat from the coolant.

In another aspect, a method for temperature control of a thermal system includes providing a system for controlling fluid temperature. The system includes an engine, a radiator fluidly coupled to the engine, a first heat exchanger coupled to the engine via a first expansion valve, a second heat exchanger coupled to the engine via a second expansion valve arranged in parallel with the first expansion valve, and a controller in electronic communication with the engine, the first expansion valve, and the second expansion valve. The method includes determining, by the controller, an operating condition of the thermal system, wherein the operating condition includes a first operating condition and a second operating condition. In response to determining that the thermal system is operating in the first operating condition, the method includes generating, by the controller, a first control signal to control the first expansion valve to direct a flow of cool coolant to the first heat exchanger and a second control signal to control the second expansion valve to direct the flow of cool coolant to the second heat exchanger, and in response to determining operation of the thermal system in the second operating condition, generating, by the controller, a third control signal to control the first expansion valve to direct a flow of warm coolant to the first heat exchanger and a fourth control signal to control the second expansion valve to direct the flow of warm coolant to the second heat exchanger.

In some aspects, the first heat exchanger is an engine oil heat exchanger.

In some aspects, the second heat exchanger is a transmission oil heat exchanger.

In some aspects, the operating condition includes a first operating condition and a second operating condition, the first operating condition including operation of the engine in a first environment and the second operating condition including operation of the heat source in a second environment and the second environment is cooler than the first environment.

In some aspects, the method further includes providing a heater core and directing the flow of warm coolant to the heater core such that the heater core rejects heat from the warm coolant.

In another aspect, an automotive vehicle includes an engine, a radiator coupled to the engine, an engine oil heat exchanger coupled to the engine, a transmission oil heat exchanger coupled to the engine, a chiller coupled to the engine via an expansion valve, a multi-position valve coupled to the chiller, the engine oil heat exchanger, the transmission oil heat exchanger, and the radiator, the multi-position valve configured to regulate a flow of coolant between the engine, the engine oil heat exchanger, the transmission oil heat exchanger, and the radiator, and a controller in electronic communication with the engine and the multi-position valve. The controller is configured to determine an operating condition of the engine and generate a control signal to control the multi-position valve to direct the flow of coolant to one or more of the engine oil and the transmission oil heat exchangers to thermally regulate a temperature of a fluid returned to the engine.

In some aspects, the multi-position valve is a single rotary valve.

In some aspects, the operating condition includes a first operating condition and a second operating condition, the first operating condition including operation of the engine in first environment and the second operating condition including operation of the heat source in a second environment and the second environment is cooler than the first environment.

In some aspects, in response to a determination, by the controller, that the thermal system is operating in the first operating condition, the controller generates a first control signal to control the multi-position valve to direct a flow of cooled coolant received from the radiator to one or both of the engine oil and transmission oil heat exchangers.

In some aspects, in response to a determination by the controller of operation under the second operating condition, the controller generates a second control signal to control the multi-position valve to direct a flow of warm coolant received from the engine to one or both of the engine oil and transmission oil heat exchangers.

In some aspects, the automotive vehicle further includes a heater core, and in a first circuit, the flow of coolant is routed from the engine to the chiller and to the heater core and the heater core rejects heat to the automotive vehicle depending on a temperature of the flow of coolant.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to Which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Use of a two-phase heat transfer compatible coolant, such as a refrigerant, in a legacy thermal system allows for capture of the latent heat of the working fluid. The captured energy can then be routed to other components of the thermal system, such as transmission and/or engine oil heat exchangers, for active warm-up control to reduce friction. The embodiments discussed herein utilize a single circuit to direct coolant from an engine to vehicle components such as a transmission oil or engine oil heat exchanger to increase the rate of warm-up of these components in cold operating conditions. Additionally, cooled coolant can be routed to provide cooling to other vehicle components using the single circuit.

Figure 1:
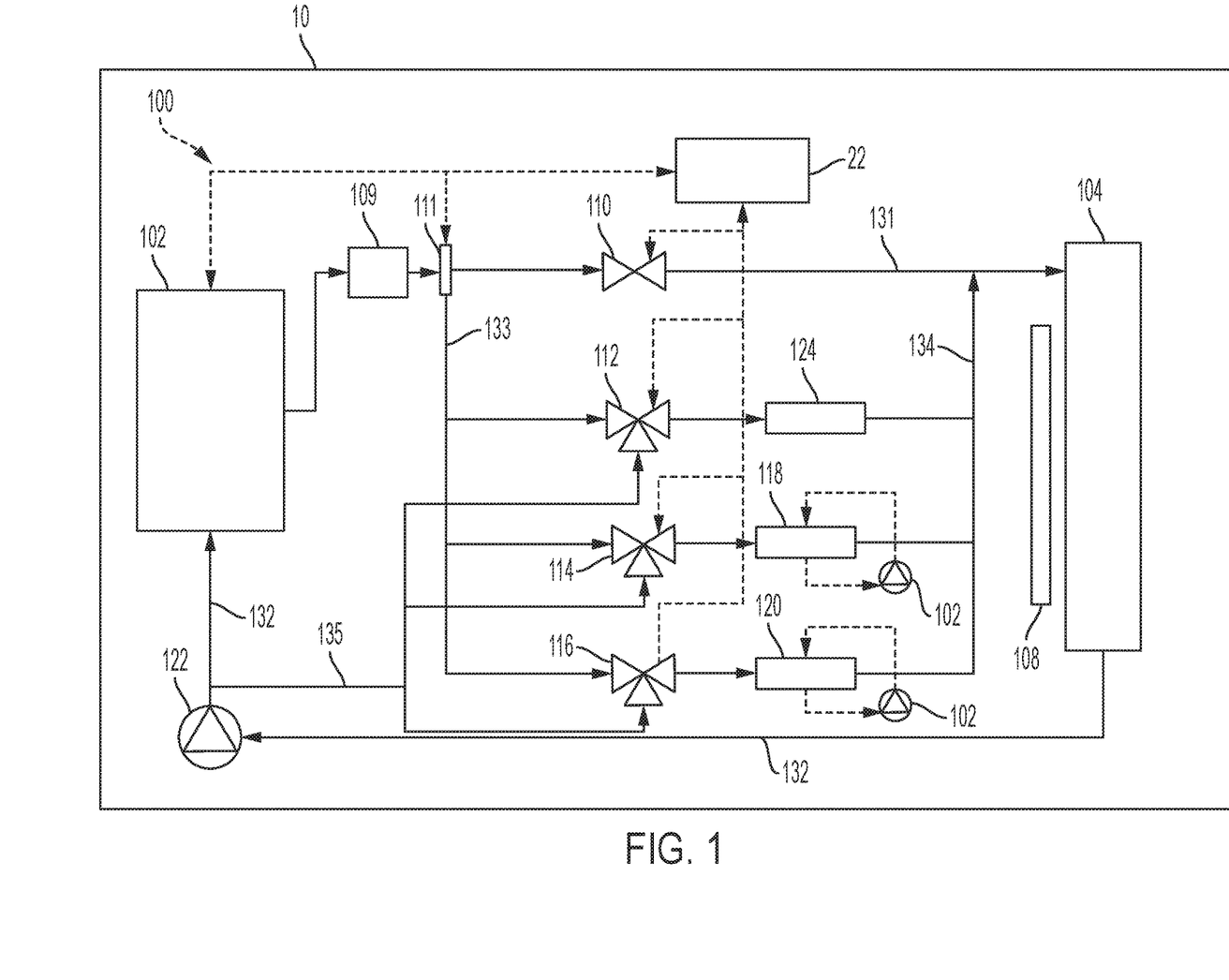
FIG. 1 is a schematic diagram of a thermal system including two-phase heat transfer and a distribution circuit of the coolant, according to an embodiment of the disclosure.

FIG. 1 is a schematic illustration of a thermal system 100 for a vehicle 10. The thermal system 100 includes two-phase heat transfer, according to an embodiment. The thermal system 100 includes, in some embodiments, a heat source 102 and a heat sink 104. In various embodiments, the heat source 102 is an engine 102 and the heat sink 104 is a radiator 104. When the heat source 102 is an engine, the engine can be any type or configuration of an internal combustion engine. In various embodiments, the thermal system 100 also includes a fan 108, a thermostat 111, and a plurality of valves 110, 112, 114, 116. In various embodiments, the plurality of valves 110, 112, 114, 116 are arranged in parallel.

In various embodiments, the thermal system 100 includes at least one controller 22. The heat source 102, the thermostat 111, and the valves 110, 112, 114, 116 are in electronic communication with the at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the connected components.

The thermal system 100 further includes, for example and without limitation, an engine oil heat exchanger 118 and a transmission oil heat exchanger 120, a turbocharger 109, one or more thermostats, such as the thermostat 111, a coolant pump 122, and a heater core 124. The coolant pump 122 is, in some embodiments, a mechanical pump. In various embodiments, the thermostat 111, the heat exchangers 118, 120, the coolant pump 122, and the heater core 124 are in electronic communication with the controller 22. In various embodiments, the controller 22 receives data from the thermostat 111 regarding the temperature of the coolant fluid and, based on one or more factors, including the temperature data, operating conditions of the heat source 102, a demanded heating or cooling level, etc., generates one or more control signals to control the flow of coolant from one or more of the valves 110, 112, 114, 116.

As shown in FIG. 1, coolant, such as a refrigerant or other two-phase heat transfer compatible coolant, flows from the heat source 102 to the plurality of valves 110, 112, 114, 116. In some embodiments, coolant flows from the heat source 102 through the turbocharger 109 prior to flowing to the plurality of valves 110, 112, 114, 116. Temperature data of the coolant is measured by the thermostat 111. The temperature data is received by the controller 22. The controller 22 uses the temperature data to determine how to direct coolant flow from each of the valves 110, 112, 114, 116.

The valve 110 is, in some embodiments, an expansion valve that directs coolant flow directly to the heat sink 104. Heated coolant from the heat source 102 flows along a first flow path 131 toward the heat sink 104 and the fan 108. The hot fluid is cooled and returns to the heat source 102 via a second flow path 132. In various embodiments, the pump 122 assists the flow of cooled fluid toward the heat source 102.

The valves 112, 114, 116 facilitate active heating and/or cooling of a fluid, such as engine oil or transmission oil, as shown in FIG. 1 by the flow paths discussed herein. The valves 112, 114, 116 are expansion valves that capture the heat of the coolant and redirect the captured heat to other vehicle components to provide active heating. Heated coolant flows from the heat source 102 to each of the valves 112, 114, 116 via a third flow path 133. The valve 112 directs the heated fluid to the heater core 124. The heater core 124 is a heat exchanger designed to reject heat to the vehicle cabin to warm a passenger compartment of the vehicle, if desired; flow from the heater core 124 then rejoins the first flow path 131.

The valves 114 and 116 receive heated coolant from the heat source 102 and route the coolant as needed to provide thermal control via components such as the engine oil heat exchanger 118 and the transmission oil heat exchanger 120. In various aspects, a demanded heating condition is determined by the controller 22 in electronic communication with one or more components of the system 100, including the valves 114, 116. The valve 114 directs coolant received via the third flow path 133 from the heat source 102 to the engine oil heat exchanger 118 and the valve 116 directs coolant received via the third flow path 133 to the transmission oil heat exchanger 120 based on the demanded condition. The hot coolant from the heat source 102 is used for active warm-up control of the transmission and engine oil via the heat exchangers 118, 120. Once the heat energy of the hot coolant is captured and distributed to the heat exchangers 118, 120, the coolant rejoins the first flow path 131 directed to the heat sink 104 via a fourth flow path 134.

The valves 112, 114, 116 also receive cooled coolant from the heat sink 104 via a fifth flow path 135. The cooled coolant from the heat sink 104 is also directed to one or both of the engine oil heat exchanger 118 and the transmission oil heat exchanger 120 based on a demanded cooling condition, which is also determined by the controller 22. As discussed above, the cooled coolant is returned to the heat source 102 from one or both of the heat exchangers 118, 120 via the second flow path 132. In various embodiments, the cooled coolant is also be directed to the heater core 124 to absorb heat if the cabin temperature is above the coolant temperature and cooling is desired.

In various embodiments, recirculation circuits at each of the engine oil heat exchanger 118 and the transmission oil heat exchanger 120 recirculate engine oil and transmission oil through the respective heat exchangers based on a demanded heating or cooling condition.

Figure 2:
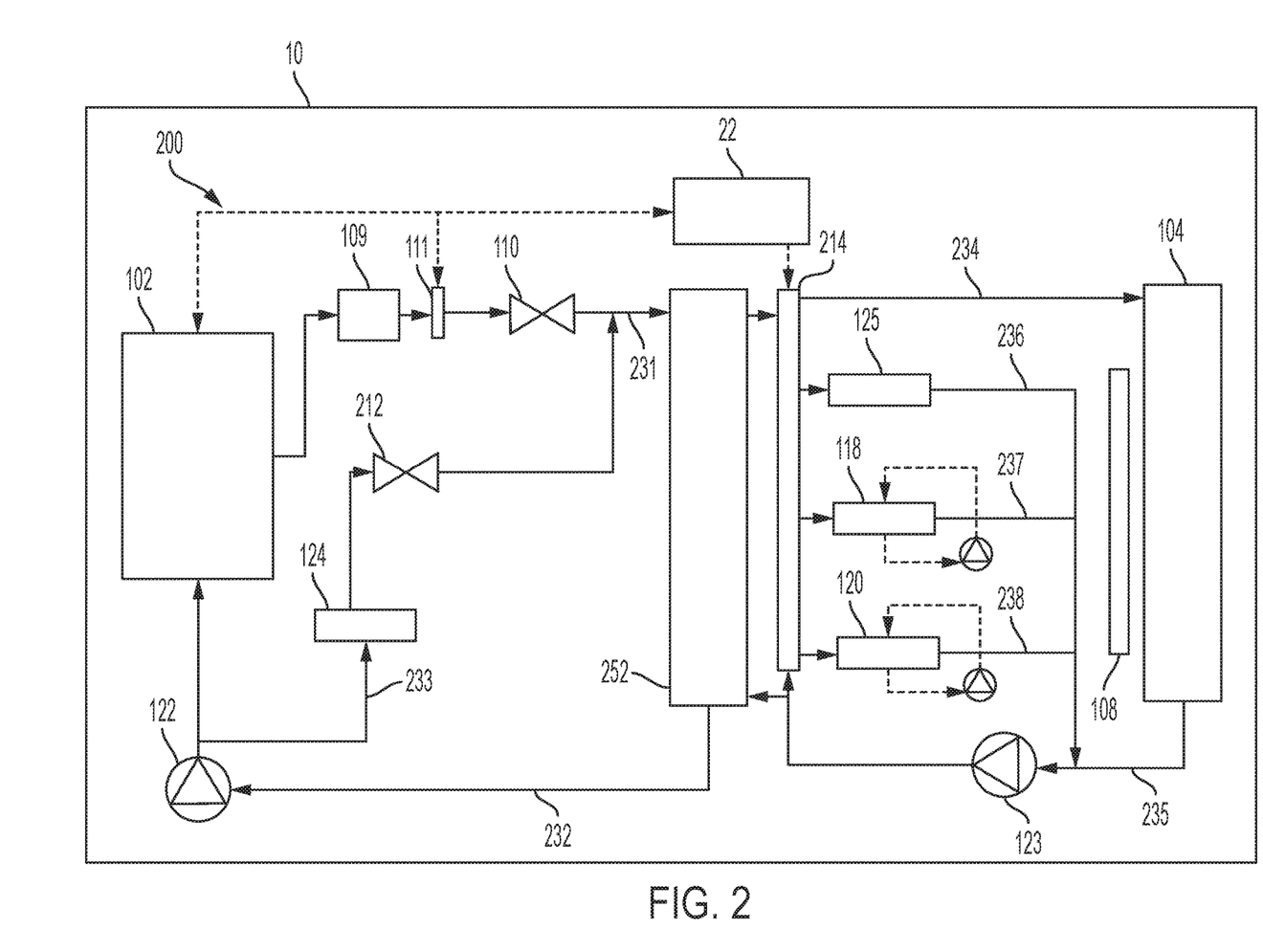
FIG. 2 is a schematic diagram of a thermal system including a secondary cooling circuit, according to an embodiment of the disclosure.

FIG. 2 illustrates another embodiment of a thermal system 200 including two-phase heat transfer. Similar to the thermal system 100, the thermal system 200 combines a two-phase heat transfer working fluid coolant, such as a refrigerant, and recovers thermal energy from the coolant and directs the coolant to other vehicle components such as the engine oil heat exchanger 118 and/or the transmission oil heat exchanger 120 for warming and cooling functions and to increase vehicle fuel economy. In the embodiment shown in FIG. 2, heat recovered from the coolant coming from the heat source 102 is rejected to a secondary circuit that distributes the coolant to the other vehicle components. Throughout FIG. 2, similar components as those discussed in FIG. 1 have similar reference numbers.

The thermal system 200 includes, in some embodiments, a heat source 102 and a heat sink 104. In various embodiments, the heat source 102 is an engine 102 and the heat sink 104 is a radiator 104. When the heat source 102 is an engine, the engine can be any type or configuration of an internal combustion engine. In various embodiments, the thermal system 200 also includes a fan 108, a thermostat 111, a first expansion valve 110, a second expansion valve 212, a chiller 252, and a valve 214. The thermal system 200 also includes at least one controller 22 that is in electronic communication with at least the heat source 102 and the valves 110, 212, 214.

The thermal system 200 further includes, for example and without limitation, an engine oil heat exchanger 118 and a transmission oil heat exchanger 120, a turbocharger 109, one or more thermostats, such as the thermostat 111, a coolant pump 122, a second pump 123, a first heater core 124, and a second heater core 125. The coolant pump 122 is, in some embodiments, a mechanical pump. The second pump 123 is, in some embodiments, an electric pump. In various embodiments, the thermostat 111, the heat exchangers 118, 120, the coolant pump 122, the second pump 123, and the heater cores 124, 125 are in electronic communication with the controller 22. In various embodiments, the controller 22 receives data from the thermostat 111 regarding the temperature of the coolant fluid and, based on one or more factors, including the temperature data, operating conditions of the heat source 102, a demanded heating or cooling level, etc., generates one or more control signals to control the flow of coolant from the valve 214.

In a first circuit, coolant is routed from the heat source 102 via the thermostat 111 and the first expansion valve 110 to the chiller 252, via a first flow path 231. Cooled coolant fluid returns to the heat source 102 via a second flow path 232. In various embodiments, the coolant is routed to the first heater core 124 via a third flow path 233. The heated coolant flows through the second expansion valve 212 and rejoins the first flow path 231. The heater core 124 in this configuration can be designed to reject heat to the cabin or adsorb heat depending on the working fluid selected and its temperature.

In a second circuit, coolant is routed from the heat source 102 via the thermostat 111 and the first expansion valve 110 to the chiller 252 via the first flow path 231, and then continues to the valve 214. In various embodiments, the valve 214 receives the fluid from the heat source 102 and routes the fluid as needed to provide thermal control for the heat source via components such as the engine oil heat exchanger 118 and the transmission oil heat exchanger 120. In various aspects, a demanded heating condition is determined by the controller 22 in electronic communication with one or more components of the system 200, including the valve 214. The valve 214 directs fluid received via the first flow path 231 from the heat source 102 directly to the heat sink 104 via a fourth flow path 234. Coolant flow from the heat sink 104 is routed to one or both of the valve 214 and the chiller 252 via a fifth flow path 235.

The valve 214 also directs coolant to the second heater core 125 (via a sixth flow path 236) and to one or both of the engine oil heat exchanger 118 (via a seventh flow path 237) and the transmission oil heat exchanger 120 (via an eighth flow path 238) based on the demanded condition. The heated fluid from the heat source 102 is used for active warm-up control of the transmission and engine oil via the heat exchangers 118, 120. The coolant flows from the second heater core 125, the engine oil heat exchanger 118, and the transmission oil heat exchanger 120 rejoin the flow of fluid returning to the heat source 102 via the fifth flow path 235.

As shown in FIG. 2, the heat from the coolant is rejected to the second circuit which routes coolant flow to and from the heat source 102 and the heat sink 104 to provide both warming and cooling functions for various vehicle components. In various embodiments, the valve 214 is a single multi-position rotary valve configured to receive both heated and cooled fluid and direct the fluid to one or more components, as discussed herein.

Using the multi-position rotary valve 214 enables a constant, high flow rate of coolant fluid to connected components, such as the heat exchangers 118, 120. This constant, high flow rate of coolant enables transmission and/or engine oil warm up targeting set points above engine coolant temperatures that is accomplished by applying warm coolant flow to the engine oil heat exchanger 118 and/or the transmission oil heat exchanger 120. Additionally, under heavy operating conditions, such as a maximum towing operation, the valve 214 enables a flow of coolant to deliver transmission and/or engine oil cooling to or below target engine coolant levels. In extreme cold operating conditions, the valve 214 is configured to reduce or stop the flow of coolant based on demands by the second heater core 125. Furthermore, the valve 214 provides pressure relief for the system 200 by forcing fluid flow through the heat exchangers 118, 120 from the cooling or warming sources (that is, the heat sink 104 and the heat source 102), avoiding additional bypass circuits that increase the mechanical and packaging complexities of the system 200.

Figure 3:
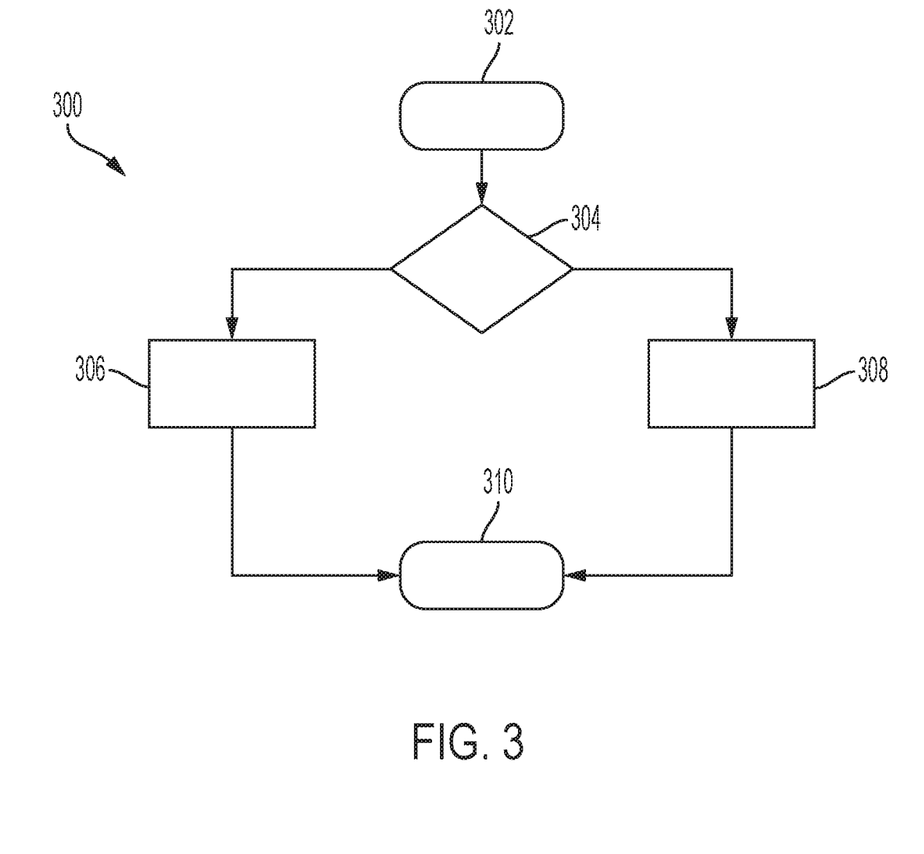
FIG. 3 is a flowchart of a method for control of a thermal system including a heat source, such as an engine, according to an embodiment of the disclosure.

FIG. 3 illustrates a method 300 for temperature control of a thermal system, according to an embodiment. The method 300 can be utilized in connection with either of the systems 100, 200 discussed herein. The method 300 can be utilized in connection with the controller 22 as discussed herein, or by other systems associated with or separate from the thermal system, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

The method 300 begins at 302 and proceeds to 304. At 304, the controller 22 determines an operating condition of the heat source 102. In various embodiments, the operating condition is one of a first operating condition and a second operating condition. In various embodiments, the first operating condition includes operation in a hot environment in which the ambient air temperature is greater than approximately eighty (80) degrees Fahrenheit and/or operation in a heavy load condition, such as a towing operation. In various embodiments, the second operating condition includes operation in a cold environment in which the ambient air temperature is less than approximately fifteen (15) degrees Fahrenheit. In various embodiments, the hot environment is a first environment and the cold environment is a second environment that is cooler than the first environment. The higher temperature differential between the coolant and the outside air makes heat transfer more efficient, leading to more efficient operation of the heat source 102.

If the determination at 304 is that the heat source 102 is operating in the first operating condition, the method 300 proceeds to 306. At 306, the controller 22 controls the valves 114, 116 of the thermal system 100 or the valve 214 of the thermal system 200 to direct a flow of cooled coolant received from the heat sink 104 to one or both of the engine oil heat exchanger 118 and the transmission oil heat exchanger 120. The flow of cooled coolant to the heat exchangers 118, 120 controls the temperature of the different oil sumps based on the first operating condition to provide improved fuel economy and friction reduction.

If the determination at 304 is that the heat source 102 is operating in the second operating condition, the method 300 proceeds to 308. At 308, the controller 22 controls the valves 114, 116 of the thermal system 100 or the valve 214 of the thermal system 200 to direct a flow of warm coolant received from the heat source 102 to one or both of the engine oil heat exchanger 118 and the transmission oil heat exchanger 120. The flow of heated coolant to the heat exchangers 118, 120 provides a faster warm-up and reduces operation friction.

From both 306 and 308, the method 300 proceeds to 310 and ends. In various embodiments, the method 300 repeats as the controller 22 receives data from sensors or other devices associated with the heat source 102 to determine current operating conditions and to continue capture and redirection of captured heat energy from the coolant fluid.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an", and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, hut may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term. "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system for controlling fluid temperature in a thermal system, comprising:
   a heat source;
   a heat sink coupled to the heat source such that a flow of coolant passes between the heat source and the heat sink;
   a first heat exchanger coupled to the heat source;
   a second heat exchanger coupled to the heat source;
   a first expansion valve coupled to the heat source and the first heat exchanger, the first expansion valve configured to regulate the flow of coolant between the heat source and the first heat exchanger;
   a second expansion valve coupled to the heat source and the second heat exchanger, the second expansion valve configured to regulate the flow of coolant between the heat source and the second heat exchanger; and
   a controller in electronic communication with the heat source, the first expansion valve, and the second expansion valve, the controller configured to determine an operating condition of the thermal system and generate a first control signal to control the first expansion valve to direct the flow of coolant to the first heat exchanger and a second control signal to control the second expansion valve to direct the flow of coolant to the second heat exchanger;
   wherein the first and second expansion valves are arranged in parallel to recover heat rejected from the coolant and distribute the recovered heat to the first and second heat exchangers.

2. The system of claim 1, wherein the heat source is an engine.

3. The system of claim 2, wherein the first heat exchanger is an engine oil heat exchanger.

4. The system of claim 1, wherein the heat sink is a radiator.

5. The system of claim 1, wherein the second heat exchanger is a transmission oil heat exchanger.

6. The system of claim 1, wherein the operating condition includes a first operating condition and a second operating condition, the first operating condition including operation of the heat source in a first environment and the second operating condition including operation of the heat source in a second environment, and the second environment is cooler than the first environment.

7. The system of claim 1, wherein the coolant is a two-phase heat transfer compatible fluid.

8. The system of claim 1, wherein the coolant is a refrigerant.

9. The system of claim 1 further comprising a heater core and the controller is further configured to direct the flow of coolant to the heater core such that the heater core rejects heat from the coolant.

\* \* \* \* \*